(12) United States Patent
Tamayo

(10) Patent No.: US 12,430,006 B2
(45) Date of Patent: Sep. 30, 2025

(54) GENERATING DYNAMIC USER INTERFACE CONTENT

(71) Applicant: Capital One Services, LLC, McLean, VA (US)

(72) Inventor: Bryan Tamayo, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 127 days.

(21) Appl. No.: 18/457,849

(22) Filed: Aug. 29, 2023

(65) Prior Publication Data

US 2025/0077047 A1    Mar. 6, 2025

(51) Int. Cl.
*G06F 3/0483* (2013.01)
*G06F 3/0482* (2013.01)
*G06F 3/04845* (2022.01)
*G06F 40/40* (2020.01)

(52) U.S. Cl.
CPC .......... *G06F 3/0483* (2013.01); *G06F 3/0482* (2013.01); *G06F 3/04845* (2013.01); *G06F 40/40* (2020.01)

(58) Field of Classification Search
CPC .. G06F 3/0483; G06F 3/0482; G06F 3/04845; G06F 40/40
See application file for complete search history.

(56) References Cited

U.S. PATENT DOCUMENTS

| | | | |
|---|---|---|---|
| 9,798,450 B1 | 10/2017 | Urasaki et al. | |
| 10,769,682 B1 * | 9/2020 | McDonald | G06F 3/0488 |
| 10,921,952 B2 | 2/2021 | Hong | |
| 11,917,214 B1 * | 2/2024 | Bell-Geddes | H04N 21/4668 |
| 2013/0174045 A1 * | 7/2013 | Sarukkai | G06Q 30/0255 715/744 |
| 2016/0196491 A1 * | 7/2016 | Chandrasekaran | G06F 16/26 706/50 |
| 2017/0149711 A1 * | 5/2017 | Shaw | H04L 67/535 |
| 2017/0329464 A1 | 11/2017 | Hong | |
| 2018/0130097 A1 * | 5/2018 | Tran | G06F 3/0485 |
| 2018/0341716 A1 * | 11/2018 | Iyer | G06F 16/437 |
| 2020/0211289 A1 * | 7/2020 | Han | G06F 3/04883 |
| 2022/0035869 A1 * | 2/2022 | Beck | G06F 16/90328 |
| 2024/0257418 A1 * | 8/2024 | Lundin | G06F 40/289 |

* cited by examiner

*Primary Examiner* — Daniel Samwel
(74) *Attorney, Agent, or Firm* — Harrity & Harrity, LLP

(57) ABSTRACT

In some implementations, a device may receive, from a user device, a request relating to a user interface element of a user interface presented on the user device. The request may be based on a user interaction, associated with a user, with the user interface element in an initial state including first content. The device may determine, responsive to the request, second content for an expanded state of the user interface element based on one or more user interface attributes associated with the user. The device may transmit, to the user device, the second content to cause the user interface element to transition from the initial state including the first content to the expanded state including the second content.

20 Claims, 9 Drawing Sheets

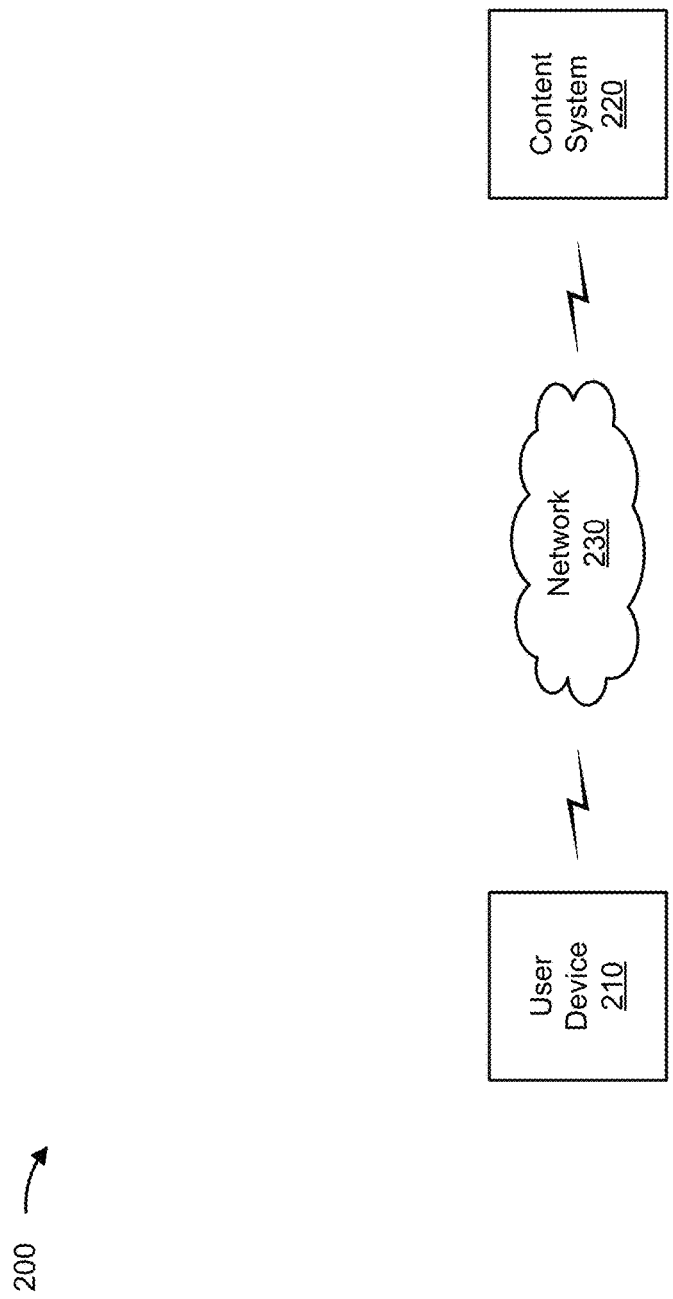

GENERATING DYNAMIC USER INTERFACE CONTENT

BACKGROUND

A graphical user interface is a form of user interface that allows users to interact with electronic devices. A web browser may provide a graphical user interface that presents web pages. A user may navigate to a web page by entering a web address into an address bar of the web browser and/or by clicking a link displayed via another web page. Navigation to a web page may consume resources of a user device on which the web browser is installed, may consume resources of a web server that serves the web page to the user device, and may consume network resources used for communications between the user device and the web server.

SUMMARY

Some implementations described herein relate to a system for generating dynamic user interface content. The system may include one or more memories and one or more processors communicatively coupled to the one or more memories. The one or more processors may be configured to receive, from a user device presenting a web page of a website, a request relating to a user interface element of the web page, where the request is based on a user interaction, associated with a user, with the user interface element in an initial state including first content. The one or more processors may be configured to determine, responsive to the request, second content for an expanded state of the user interface element based on one or more user interface attributes associated with a use of the website by the user, where the second content includes one or more links for the website. The one or more processors may be configured to transmit, to the user device, the second content to cause the user interface element to transition from the initial state including the first content to the expanded state including the second content.

Some implementations described herein relate to a method of generating dynamic user interface content. The method may include receiving, from a user device, a request relating to a user interface element of a user interface presented on the user device, where the request is based on a user interaction, associated with a user, with the user interface element in an initial state including first content. The method may include determining, responsive to the request, second content for an expanded state of the user interface element based on one or more user interface attributes associated with the user. The method may include transmitting, to the user device, the second content to cause the user interface element to transition from the initial state including the first content to the expanded state including the second content.

Some implementations described herein relate to a non-transitory computer-readable medium that stores a set of instructions. The set of instructions, when executed by one or more processors of a device, may cause the device to detect a user interaction, associated with a user, with a user interface element in an initial state including first content, where the user interface element is in a user interface presented on the device. The set of instructions, when executed by one or more processors of the device, may cause the device to transmit, to a server device and based on the user interaction, a request relating to the user interface element. The set of instructions, when executed by one or more processors of the device, may cause the device to receive, from the server device, second content for an expanded state of the user interface element, where the second content is based on one or more user interface attributes associated with a use of the user interface by the user, and where the second content includes one or more links to one or more resources. The set of instructions, when executed by one or more processors of the device, may cause the device to cause the user interface element to transition from the initial state including the first content to the expanded state including the second content.

BRIEF DESCRIPTION OF THE DRAWINGS

FIG. 2 is a diagram of an example environment in which systems and/or methods described herein may be implemented, in accordance with some embodiments of the present disclosure.

DETAILED DESCRIPTION

Figure 1A:
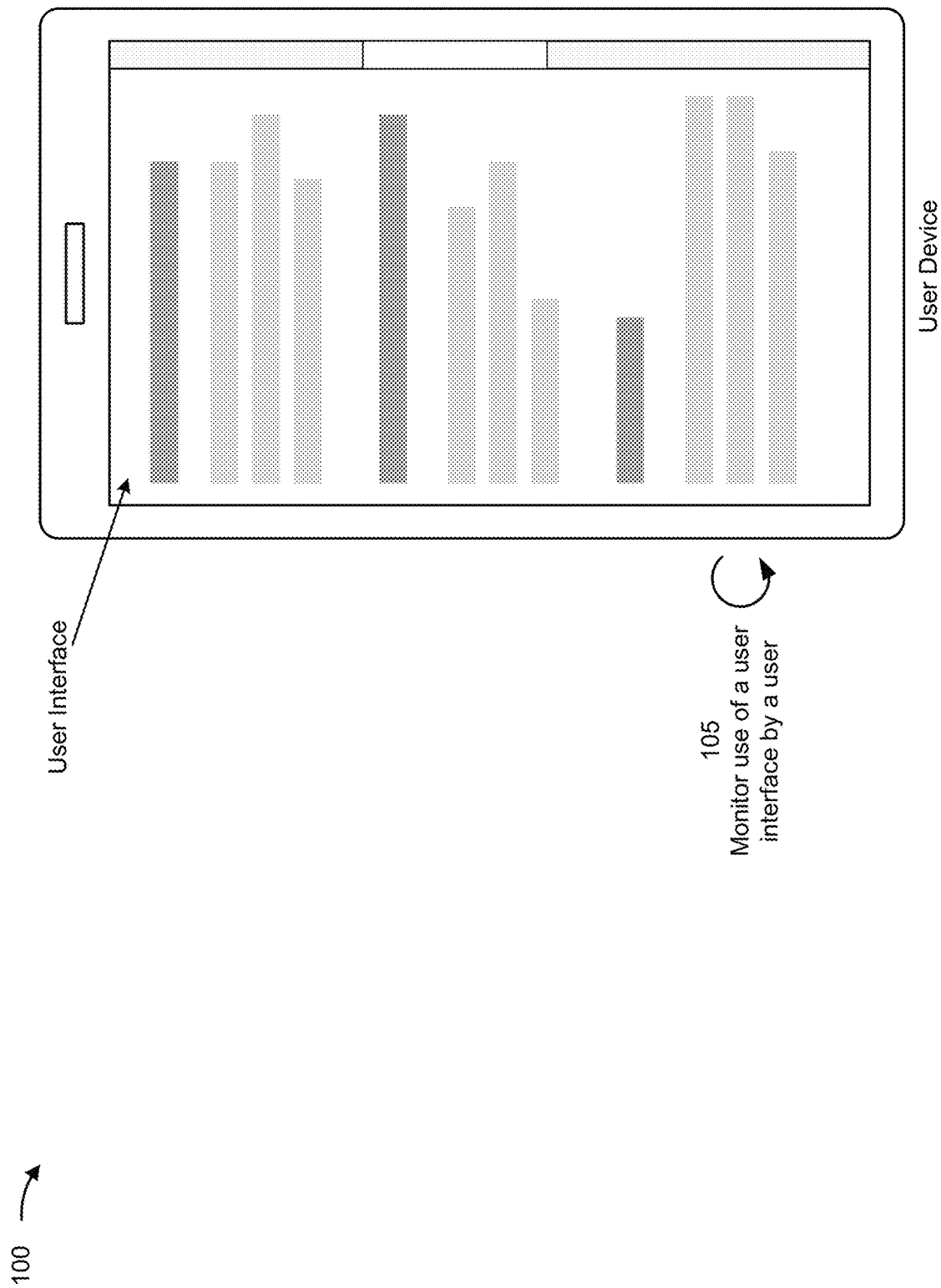
FIGS. 1A-1E are diagrams of an example associated with generating dynamic user interface content, in accordance with some embodiments of the present disclosure.

The following detailed description of example implementations refers to the accompanying drawings. The same reference numbers in different drawings may identify the same or similar elements.

A user interface of a user device, such as a user interface provided by a web browser, may include a web page for presentation via the user device. The web page may include hyperlinks to various other web pages in one or more navigational menus. Often, it may be difficult for a user to locate particular information of interest using a navigational menu. For example, descriptions of the navigational menu may be unintuitive and/or the user may need to click through navigational menus in multiple hierarchical levels in order to locate the information of interest. Navigating through a large number of web pages to find relevant information creates a poor user experience, consumes excessive computing resources (e.g., processing resources and memory resources) that are needed for the user device to generate and display the web pages and that are needed for one or more server devices to serve the web pages to the user device, and consumes excessive network resources that are needed for communications between the user device and the server device.

Some implementations described herein enable efficient navigation in a user interface. In some implementations, the user interface may include a user interface element with content that can be dynamically adapted to facilitate navigation. For example, in response to a user interaction with the user interface element, the user interface element may transition from an initial state including first content to an expanded state included second content. The second content may include one or more links to resources, such as web pages. The second content may be variable and based on user interface attributes (e.g., an amount of time spent on a web page, a scroll depth, a browsing history, or the like) associated with a use of the user interface by a user. The user interface attributes may indicate a behavior of the user in the user interface, and therefore can be used to predict second content that has a probability of promoting user engagement. Accordingly, the user may be efficiently directed to resources likely to be of interest to the user. In this way, computing resources and/or network resources may be conserved by reducing an amount of navigation performed by the user. Furthermore, the techniques described herein make data easier to access by enhancing a user interface, thereby improving a user experience, enhancing user-friendliness of a user device and the user interface, and improving the ability of a user to use the user device.

FIGS. 1A-1E are diagrams of an example 100 associated with generating dynamic user interface content. As shown in FIGS. 1A-1E, example 100 includes a user device and a content system. These devices are described in more detail in connection with FIGS. 2 and 3.

The user device may be associated with a user. The user device may present a user interface on a display of the user device. The user interface may include a web page of a website, a collection of web pages of a website, one or more pages of a mobile application, or another type of user interface. The user interface may include content, such as textual content, graphical content, audio content, and/or video content, among other examples. The content may provide information relating to goods and/or services offered by an entity. For example, the user interface may be associated with an objective (e.g., enticing the purchasing of goods, the registering for a service, or the like), and the content may relate to the objective. The user interface may also include a user interface element (e.g., an element configured to respond in some manner to an interaction from the user of the user interface), such as a button. As described herein, the user interface element may be dynamically adaptable between an initial state including first content and an expanded state including second content. As described herein, the second content may be configured to direct the user to destinations in the user interface that are associated with a probability of being of interest to the user (e.g., thereby furthering the objective). The content system may be configured to receive requests (e.g., hypertext transfer protocol (HTTP) requests) for content for the user interface, and to provide content for the user interface.

As shown in FIG. 1A, and by reference number 105, the user device may monitor the user's use of the user interface. The user's use of the user interface may relate to any action performed by the user (e.g., scrolling, clicking, and/or selecting) or any inaction of the user (e.g., idleness) while using the user interface (e.g., while the user interface is presented on the user device). In some implementations, the user device may monitor the user's use of the user interface via code (e.g., one or more code snippets, code libraries, code files, or the like) incorporated in a document object (e.g., a code document) that encodes content in the user interface. For example, the code may be configured to collect data relating to user interactions with the user interface (e.g., user interactions made via one or more input devices of the user device) and/or relating to a state of the user interface.

The user's use of the user interface may indicate one or more user interface attributes associated with the user. For example, the user interface attributes may be based on the data collected by the code. The user interface attributes may relate to an amount of time that the user has spent on the user interface (e.g., on a website), an amount of time that the user has spent on one or more pages (e.g., web pages) of the user interface, a browsing history associated with the user for the user interface (e.g., indicating pages that the user has visited), scrolling activity (e.g., a scroll depth, a scrolling speed, and/or a scrolling direction) associated with the user for the user interface (e.g., per-page scrolling activity and/or aggregate scrolling activity across multiple pages), a clicking activity (e.g., indicating on what, where, and/or how often the user clicked, tapped, or selected) associated with the user for the user interface (e.g., per-page clicking activity and/or aggregate clicking activity across multiple pages), and/or a history of previous interactions with the user interface element.

In some implementations, the user device may transmit, and the content system may receive, data relating to the user's use of the user interface, and the content system may compute the user interface attributes based on the data. The user device may transmit the data in real-time as the data is collected, periodically, or in connection with a request for content, as described below. In some implementations, the user device may compute the user interface attributes (e.g., based on data relating to the user's use of the user interface). Here, the user device may transmit, and the content system may receive, information indicating the user interface attributes. The user device may transmit the data in real-time as the data is collected, periodically, or in connection with a request for content, as described below. In some implementations, the user device may store the data and/or the information for later transmission to the content system (e.g., in connection with a request for content, as described below). In some implementations, the content system may cause storing of the data and/or the information received from the user device (e.g., in a data structure, such as a database, in a cookie, in a session variable, or the like) for later use (e.g., in connection with a request for content, as described below).

Figure 1B:
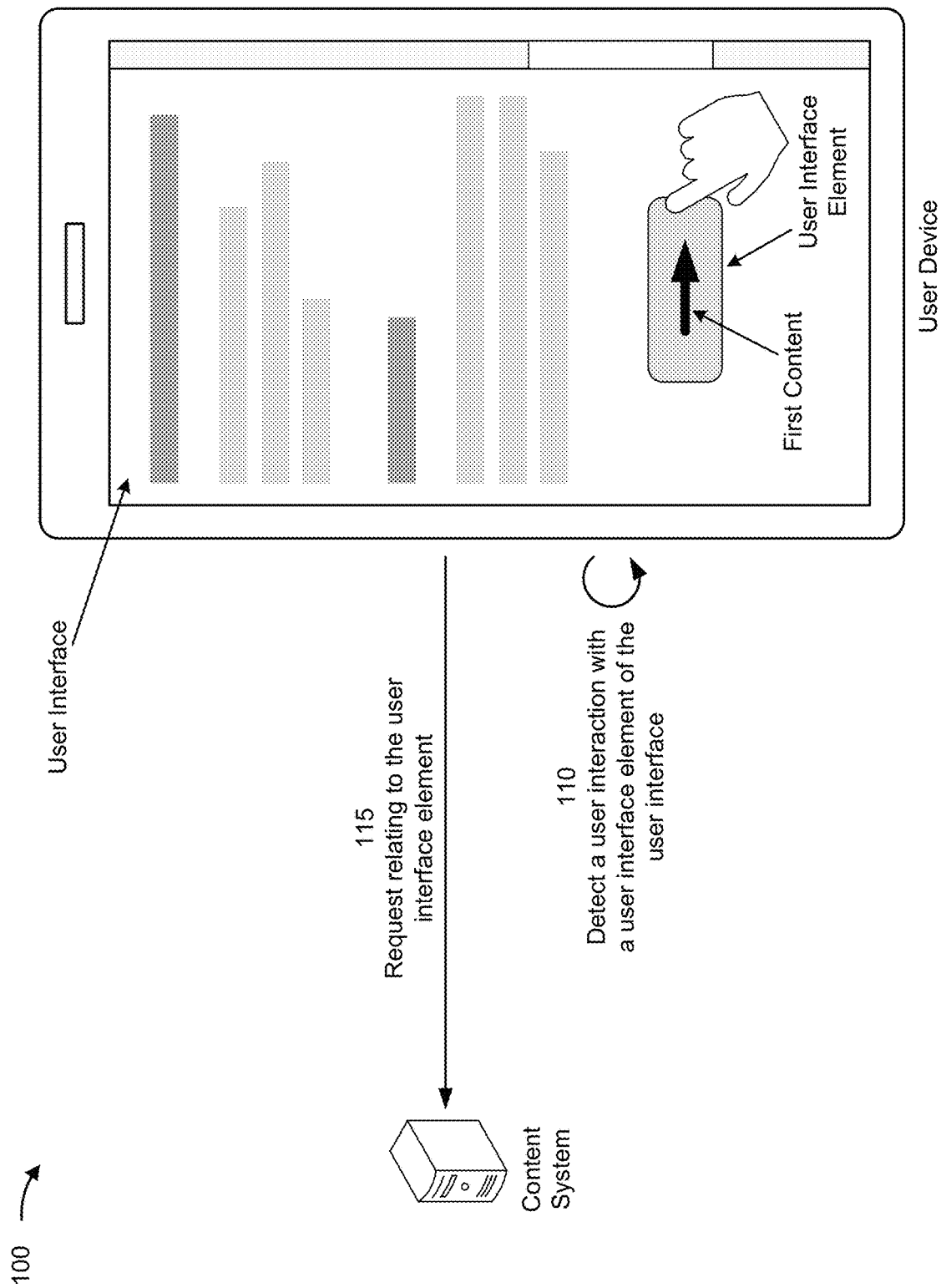

As shown in FIG. 1B, and by reference number 110, the user device may detect a user interaction, associated with the user, with the user interface element. The user interaction may include a hovering event associated with the user interface element (e.g., hovering a cursor over the user interface element), a clicking event associated with the user interface element (e.g., the user has clicked on the user interface element via the user interface), or a tapping event associated with the user interface element (e.g., the user has tapped a touchscreen on the user interface element), among other examples.

The user interface element may be in an initial state including first content at a time of the user interaction. The initial state may be a contracted state of the user interface element. The first content may include graphical content or textual content designed to entice the user to interact with the user interface element. For example, the first content may include graphical content, such as a symbol, that is broadly recognizable across different languages. In some implementations, in the initial state, the user interface element may lack navigational functionality (e.g., in the initial state, the user interface element does not cause directing to a new page in the user interface in response to a user interaction). The first content may be static for the initial state (e.g., each time the user interface element is in the initial state, the first content is the same).

As shown by reference number 115, based on the user interaction, the user device may transmit, and the content system may receive, a request relating to the user interface element. For example, the request may indicate a request for content for the user interface element. In some implementations, the request may indicate the one or more user interface attributes associated with the user (e.g., if the user interface attributes were not previously indicated to the content system, as described above). For example, the request may indicate data relating to the user's use of the user interface (e.g., to enable the content system to compute the user interface attributes from the data) and/or may indicate information indicating the user interface attributes (e.g., the user interface attributes computed by the user device). In some implementations, the content system may cause storing of information indicating the user interface attributes indicated by the request (e.g., in a data structure, a cookie, a session variable, or the like) for use in connection with a subsequent request.

In some implementations, the content system may retrieve information indicating the user interface attributes from storage (e.g., from one or more data structures, one or more cookies, one or more session variables, or the like) responsive to the request (e.g., if the user interface attributes were previously indicated to the content system, as described above). For example, the request may indicate an identifier associated with the user, and the content system may retrieve the information that is associated with the identifier.

The user interface attributes indicated by the request or retrieved by the content system may be current user interface attributes relating to a current session of the user in the user interface (e.g., a current visit of the user to a website). In some implementations, the user interface attributes may include one or more current user interface attributes relating to the current session, and one or more historical user interface attributes relating to a previous session of the user in the user interface (e.g., a previous visit of the user to the website). For example, the content system may retrieve information indicating the historical user interface attributes from storage (e.g., from one or more data structures, one or more cookies, one or more session variables, or the like) responsive to the request (e.g., regardless of whether the request indicates the current user interface attributes).

Figure 1C:
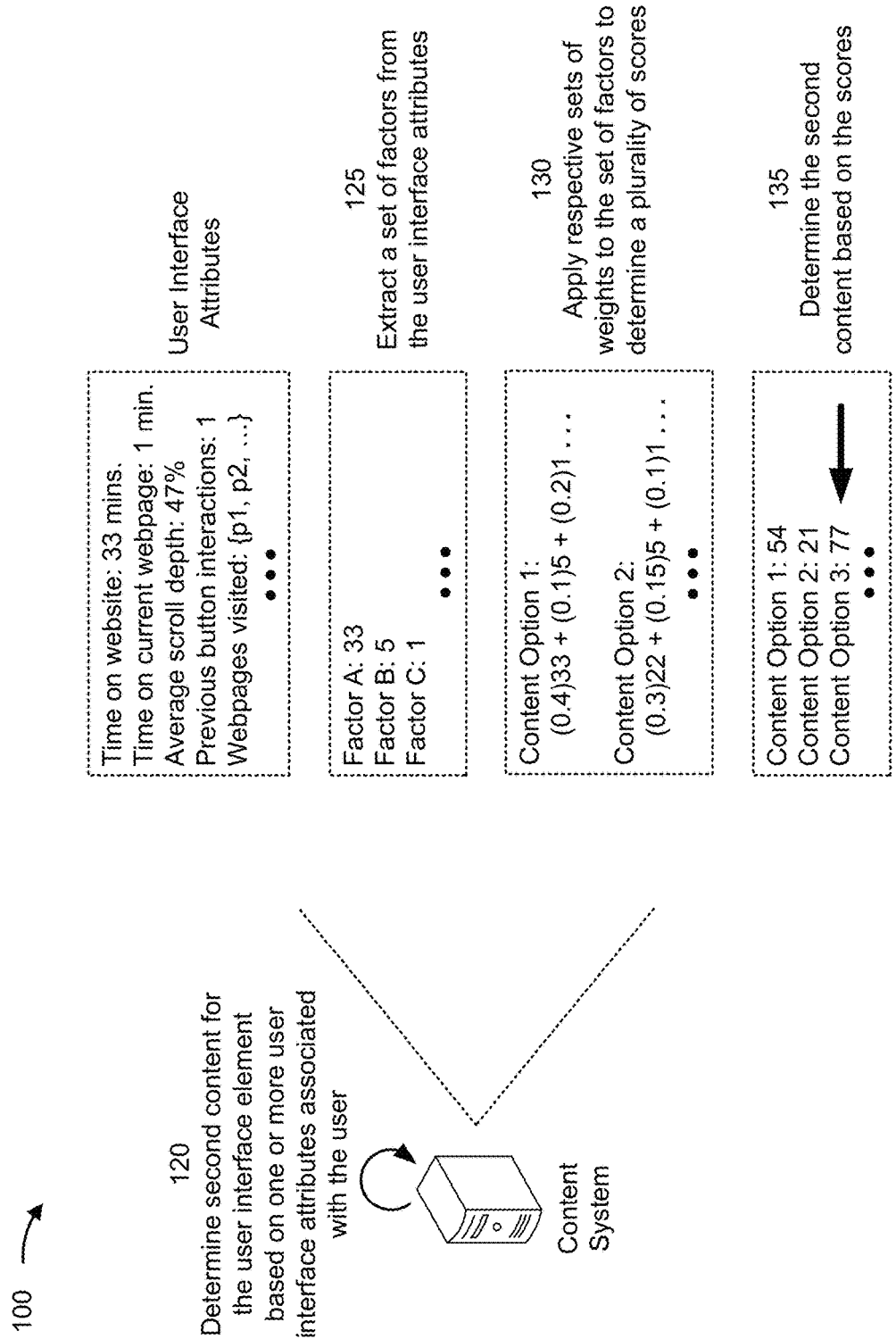

As shown in FIG. 1C, and by reference number 120, the content system may determine second content for the user interface element based on the one or more user interface attributes associated with the user (e.g., current user interface attributes and/or historical user interface attributes). The second content may be for an expanded state of the user interface element. For example, in the expanded state, the user interface element may occupy a greater area of the user interface than an area of the user interface occupied by the user interface element in the initial state. The content system may determine the second content further based on the objective of the user interface. For example, the second content may be in furtherance of the objective by enticing the user to perform one or more actions (e.g., visiting a particular web page, applying for a particular service, or the like).

The second content may provide navigational functionality to the user interface element in the expanded state (e.g., in the expanded state the user interface element reveals one or more navigation options for the user). For example, the second content may include one or more links (e.g., at least two links) to one or more resources (e.g., links to one or more web pages of a website, one or more pages of a mobile application, or the like). As an example, the user interface may include a web page of a website, and the one or more resources may be one or more other web pages of the website. The second content may include textual content, such as a call-to-action instruction (whereas the first content may only include graphical content in some examples). For example, a link may include a destination component (e.g., indicating a destination being linked to) and textual content configured to identify the destination and/or to direct the user interface to the destination (e.g., a web page, a uniform resource locator (URL), a page of a mobile application, or the like) in response to a user interaction. Accordingly, to determine the second content, the content system may determine one or more destinations and/or associated textual content for one or more links. In some implementations, the second content may be a navigation menu for the user interface. In some implementations, the user interface element may include a button, and the second content may include one or more sub-buttons of the button (e.g., each sub-button may be or include a link).

In some implementations, the content system may determine the second content based on the user interface attributes associated with the user, and further based on a location of the user interface element in the user interface (e.g., a top location, a middle location, a bottom location, or the like) and/or a type of the user device (e.g., whether the user device is capable of a hovering user interaction). For example, the user interaction with the user interface may indicate greater user interest if the user interface element is located at a bottom of the user interface verses a top of the user interface. As another example, a clicking user interaction with the user interface element may indicate greater user interest if the user device is also capable of a hovering user interaction. Moreover, the content system may determine the second content further based on supplemental information, such as social media activity associated with the user and/or a transaction history associated with the user. In some implementations, the content system may process the supplemental information (e.g., using a machine learning model) to identify interests of the user, services needed by the user, or the like.

In some implementations, the content system may determine the second content using a machine learning model. For example, the machine learning model may be trained to output the second content based on an input indicating the user interface attributes, the location of the user interface element, the type of the user device, the objective of the user interface, and/or the supplemental information.

In some implementations, the content system may determine the second content using an algorithm. The algorithm may be based on a weighting of one or more factors. A result of the algorithm may indicate a selection of one or more content options from a plurality of content options (e.g., a plurality of content options, associated with the user interface element and/or the objective of the user interface, that are configured for the content system). In one example, as shown by reference number 125, to determine the second content using the algorithm, the content system may extract a set of factors (e.g., variables) from the user interface attributes (e.g., the set of factors may include values indicated by one or more of the user interface attributes and/or values derived from one or more of the user interface attributes), from information relating to the location of the user interface element, from information relating to the type of the user device, from information relating to the objective of the user interface, and/or from the supplemental information. Continuing with the example, as shown by reference number 130, the content system may apply respective sets of weights, associated with the plurality of content options (e.g., each content option may be associated with a respective set of weights), to the set of factors to determine a plurality of scores for the plurality of content options (e.g., so that a respective score is determined for each content option). Continuing further with the example, as shown by reference number 135, the content system may determine the second content based on the plurality of scores (e.g., by selecting one or more content options associated with highest scores, lowest scores, scores in a particular range, or the like).

In another example, to determine the second content using the algorithm, the content system may extract a set of factors from the user interface attributes, from information relating to the location of the user interface element, from information relating to the type of the user device, from information relating to the objective of the user interface, and/or from the supplemental information, in a similar manner as described above, and the content system may apply a set of weights to the set of factors to determine a classification value associated with the user interface attributes. Continuing with the example, the content system may select one or more content options associated with the classification value and/or associated with a particular range of values in which the classification value falls. A content option may indicate a destination for a link and/or may indicate textual content for the link. Moreover, the content option may indicate graphical content to be used for the user interface element and/or the link and/or may indicate styling for the user interface element and/or the link.

Figure 1D:
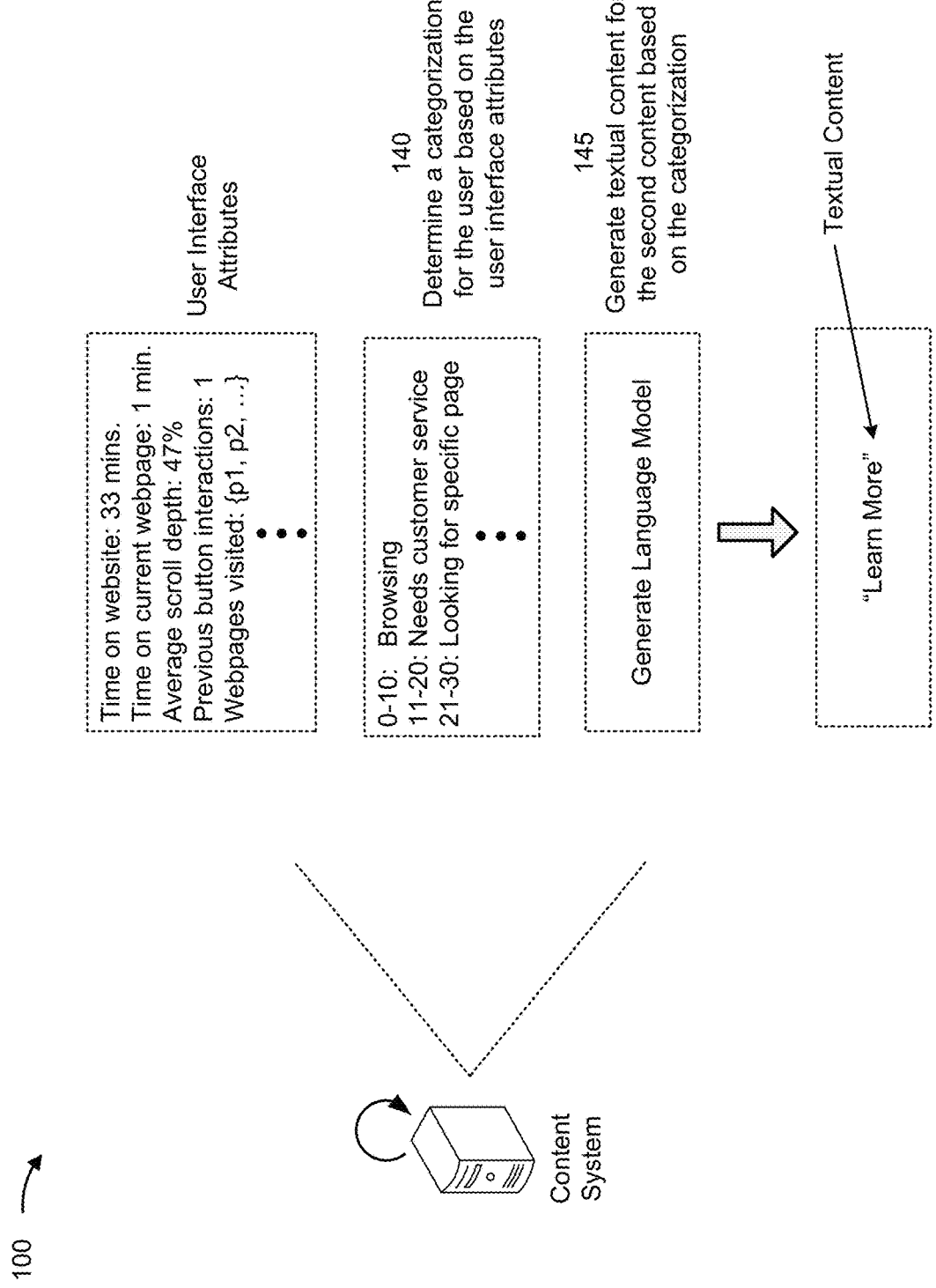

In some implementations, to determine the second content (e.g., to determine textual content for the second content), the content system may determine one or more categorizations for the user based on the one or more user interface attributes, as shown in FIG. 1D and by reference number 140. For example, the content system may apply a set of weights to a set of factors extracted from the user interface attributes, in a similar manner as described above, to determine a categorization value associated with the user. The categorization value may indicate a persona or a user archetype associated with the user. As an example, a first categorization value may indicate that the user is browsing the user interface (e.g., the user interface attributes are indicative of browsing behavior), a second categorization value may indicate that the user is in need of customer service (e.g., the user interface attributes are indicative of a behavior associated with a need for customer service), and so forth.

As shown by reference number 145, based on the one or more categorizations for the user, the content system may generate textual content for the second content. For example, the content system may use a generative language model to generate the textual content based on the categorization(s). The textual content may further be based on a destination for a link of the second content and/or the objective of the user interface. For example, the categorization(s), the destination, and/or the objective may be input to the generative language model, and the generative language model may output the textual content.

In some implementations, the content system may cause storing of information indicating the second content. For example, the content system may cause storing of the information in a data structure, such as a database. The information may be stored for use in connection with a subsequent request (e.g., in connection with a subsequent user interaction by the user with the user interface element). In particular, each time the user interacts with the user interface element, the second content of the user interface element may change based on the user's use of the user interface between user interactions with the user interface element. For example, the user interaction with the user interface element, described herein, may be subsequent to a previous interaction, of the user, with the user interface element in the initial state including the first content. Continuing with the example, the second content may be different from previous second content for the user interface element in the expanded state associated with the previous interaction. Accordingly, storing the information indicating the second content enables the content system to identify whether the second content should be changed in connection with a subsequent user interaction with the user interface element.

Figure 1E:
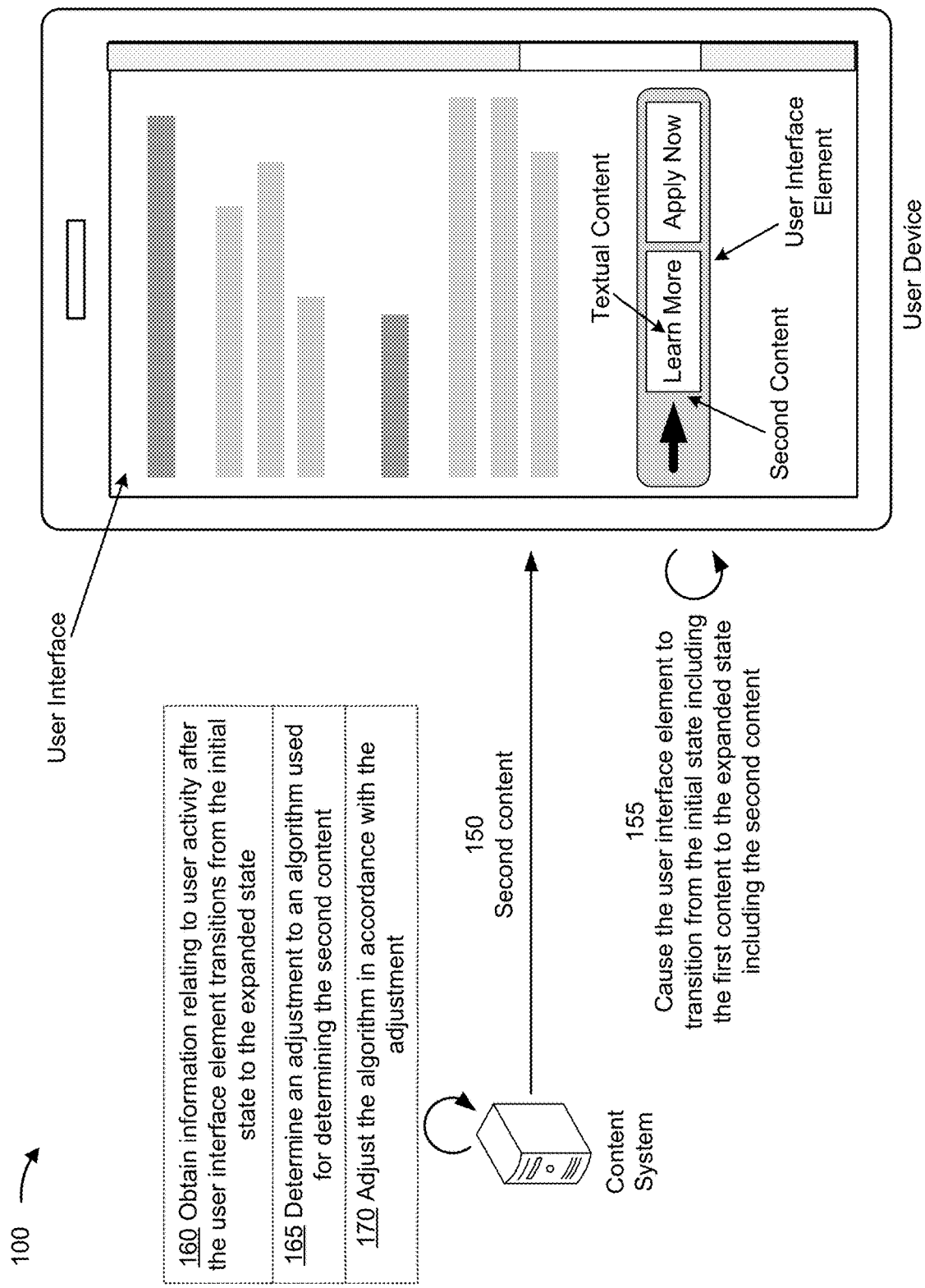

As shown in FIG. 1E, and by reference number 150, the content system may transmit, and the user device may receive, the second content. The content system may transmit the second content to cause the user interface element to transition from the initial state including the first content to the expanded state including the second content. In other words, based on receiving the second content, the user device may cause the user interface element to transition from the initial state including the first content to the expanded state including the second content, as shown by reference number 155. The transition from the initial state to the expanded state resizes the user interface element to a larger size. Moreover, the transition from the initial state to the expanded state may include changing one or more styles of the user interface element (e.g., font size, color, or the like). The transition from the initial state to the expanded state may include an animated transition.

In some implementations, the second content may include data (e.g., one or more arrays, one or more associative arrays, or the like) indicating one or more destinations (e.g., web pages, URLs, or the like) and associated textual content for one or more links. In some implementations, the second content may include code for the user interface element in the expanded state. Accordingly, to cause the user interface element to transition from the initial state including the first content to the expanded state including the second content, the user device may insert the data or the code into a document object associated with the user interface. For example, the user device may insert the data or the code into a document object model (DOM) associated with the document object.

As shown by reference number 160, the content system may obtain information relating to user activity, associated with the user, after the user interface element transitions from the initial state to the expanded state. For example, the user activity may indicate whether the user followed a link of the second content, an amount of time that the user spent on a page of the link, whether the user exited the user interface, or the like. The content system may obtain the information from the user device (e.g., based on the user device monitoring the user's use of the user interface, in a similar manner as described above), in one or more HTTP requests, or the like.

As shown by reference number 165, the content system may determine an adjustment to the algorithm (e.g., an adjustment to one or more weights used by the algorithm) used to determine the second content based on the second content and the user activity. For example, the content system may determine the adjustment to the algorithm using a machine learning model. As an example, the machine learning model may be trained to output the adjustment to the algorithm based on an input of information indicating the second content and the user activity. As shown by reference number 170, the content system may adjust the algorithm in accordance with the adjustment that is determined. For example, the content system may alter a configuration for the algorithm, one or more parameters of the algorithm, or the like, in accordance with the adjustment. In this way, the algorithm may be iteratively improved.

In some implementations, the adjustment to the algorithm may be user-specific. For example, the adjusted algorithm may be used in connection with a subsequent user interaction, associated with the user, with the user interface element, but not in connection with a user interaction with the user interface element by a different user. In this way, each additional user interaction with the user interface element by the user improves a probability that the second content is of interest to the user. In some implementations, the adjustment to the algorithm may be particular to a set of users. For example, the adjusted algorithm may be used in connection with a subsequent user interaction with the user interface element by the user or other users that share one or more characteristics with the user (e.g., based on user interface attributes). In some implementations, the adjustment to the algorithm may have general applicability to all users. For example, the adjusted algorithm may be used in connection with a subsequent user interaction with the user interface element by the user or any other user. In this way, each additional user interaction with the user interface element improves an accuracy of the algorithm in identifying the second content for the user interface element.

By using the user interface attributes, the content system can identify second content that has a probability of promoting user engagement. Accordingly, the user may be efficiently directed to resources likely to be of interest to the user. In this way, computing resources and/or network resources may be conserved by reducing an amount of navigation performed by the user. Furthermore, the expanded state of the user interface element, described herein, makes data easier to access by enhancing a user interface, thereby improving a user experience, enhancing user-friendliness of a user device and the user interface, and improving the ability of a user to use the user device.

As indicated above, FIGS. 1A-1E are provided as an example. Other examples may differ from what is described with regard to FIGS. 1A-1E.

FIG. 2 is a diagram of an example environment 200 in which systems and/or methods described herein may be implemented. As shown in FIG. 2, environment 200 may include a user device 210, a content system 220, and a network 230. Devices of environment 200 may interconnect via wired connections, wireless connections, or a combination of wired and wireless connections.

The user device 210 may include one or more devices capable of receiving, generating, storing, processing, and/or providing information associated with dynamic user interface content, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The content system 220 may include one or more devices capable of receiving, generating, storing, processing, providing, and/or routing information associated with dynamic user interface content, as described elsewhere herein. The content system 220 may include a communication device and/or a computing device. For example, the content system 220 may include a server, such as an application server, a client server, a web server, a database server, a host server, a proxy server, a virtual server (e.g., executing on computing hardware), or a server in a cloud computing system. In some implementations, the content system 220 may include computing hardware used in a cloud computing environment.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
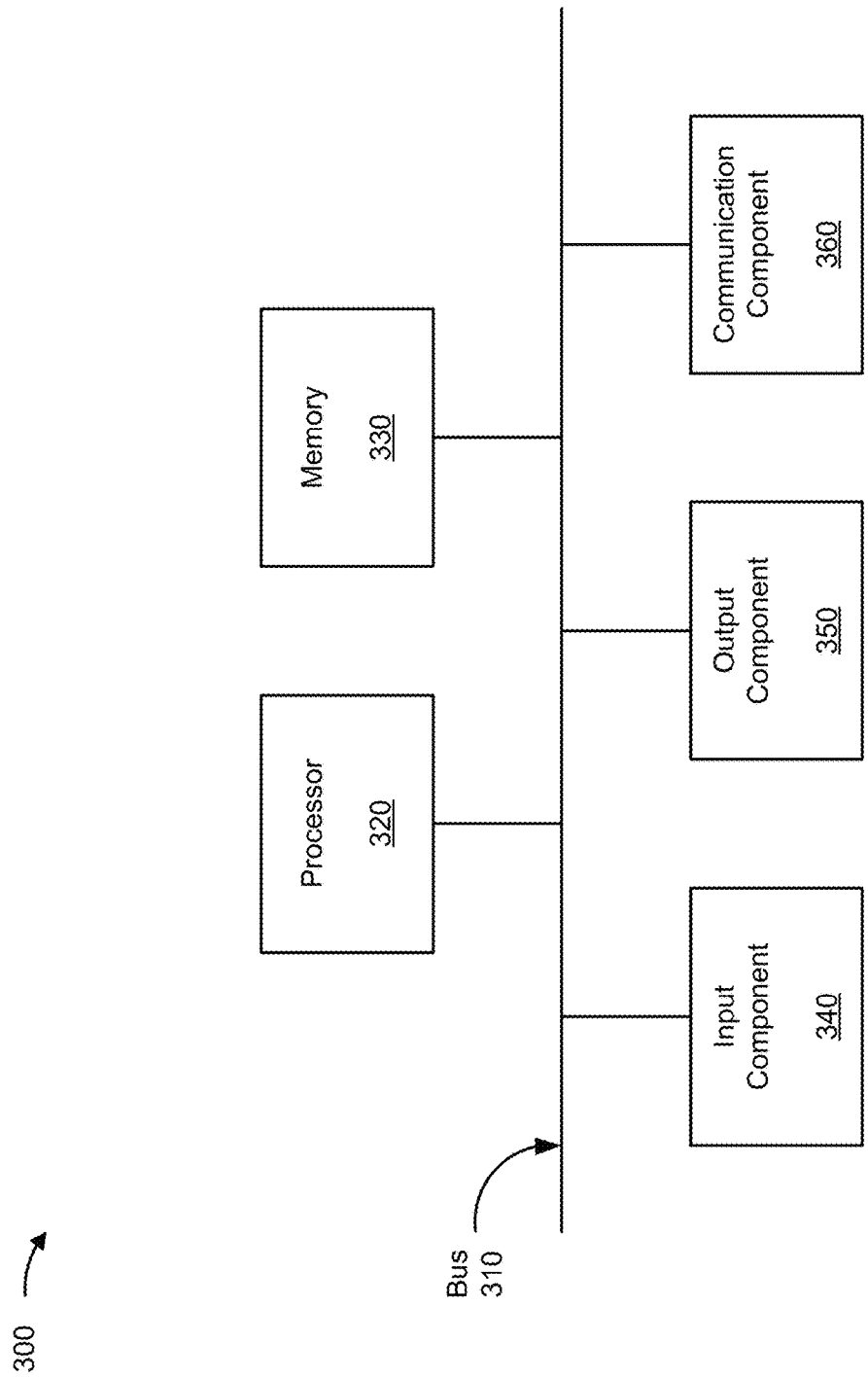
FIG. 3 is a diagram of example components of a device associated with generating dynamic user interface content, in accordance with some embodiments of the present disclosure.

FIG. 3 is a diagram of example components of a device 300 associated with generating dynamic user interface content. The device 300 may correspond to user device 210 and/or content system 220. In some implementations, user device 210 and/or content system 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
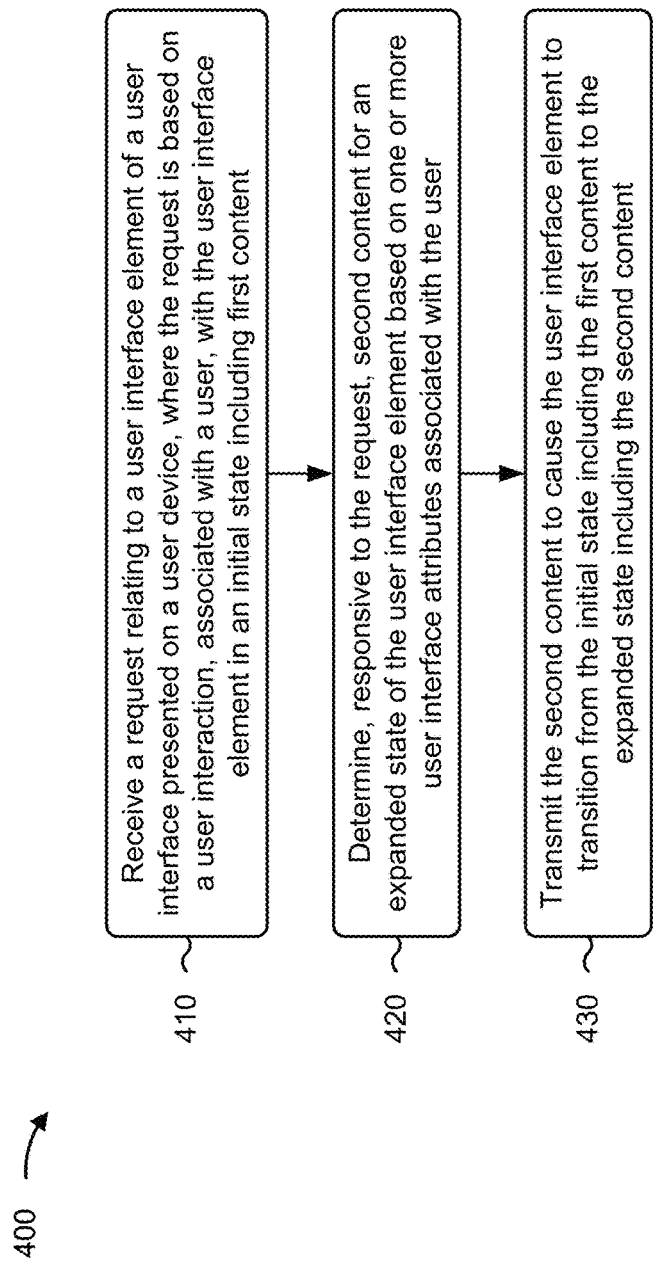
FIG. 4 is a flowchart of an example process associated with generating dynamic user interface content, in accordance with some embodiments of the present disclosure.

FIG. 4 is a flowchart of an example process 400 associated with generating dynamic user interface content. In some implementations, one or more process blocks of FIG. 4 may be performed by the content system 220. In some implementations, one or more process blocks of FIG. 4 may be performed by another device or a group of devices separate from or including the content system 220, such as the user device 210. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a user device, a request relating to a user interface element of a user interface presented on the user device, where the request is based on a user interaction, associated with a user, with the user interface element in an initial state including first content (block 410). For example, the content system 220 (e.g., using processor 320, memory 330, input component 340, and/or communication component 360) may receive, from a user device, a request relating to a user interface element of a user interface presented on the user device, as described above in connection with reference number 115 of FIG. 1B. As an example, the request may indicate data relating to the user's use of the user interface.

As further shown in FIG. 4, process 400 may include determining, responsive to the request, second content for an expanded state of the user interface element based on one or more user interface attributes associated with the user (block 420). For example, the content system 220 (e.g., using processor 320 and/or memory 330) may determine, responsive to the request, second content for an expanded state of the user interface element based on one or more user interface attributes associated with the user, as described above in connection with reference number 120 of FIG. 1C. As an example, the second content may provide navigational functionality to the user interface element in the expanded state (e.g., in the expanded state the user interface element reveals one or more navigation options for the user), such as one or more links.

As further shown in FIG. 4, process 400 may include transmitting, to the user device, the second content to cause the user interface element to transition from the initial state including the first content to the expanded state including the second content (block 430). For example, the content system 220 (e.g., using processor 320, memory 330, and/or communication component 360) may transmit, to the user device, the second content to cause the user interface element to transition from the initial state including the first content to the expanded state including the second content, as described above in connection with reference number 150 of FIG. 1E. As an example, the transition from the initial state to the expanded state resizes the user interface element to a larger size.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

Figure 5:
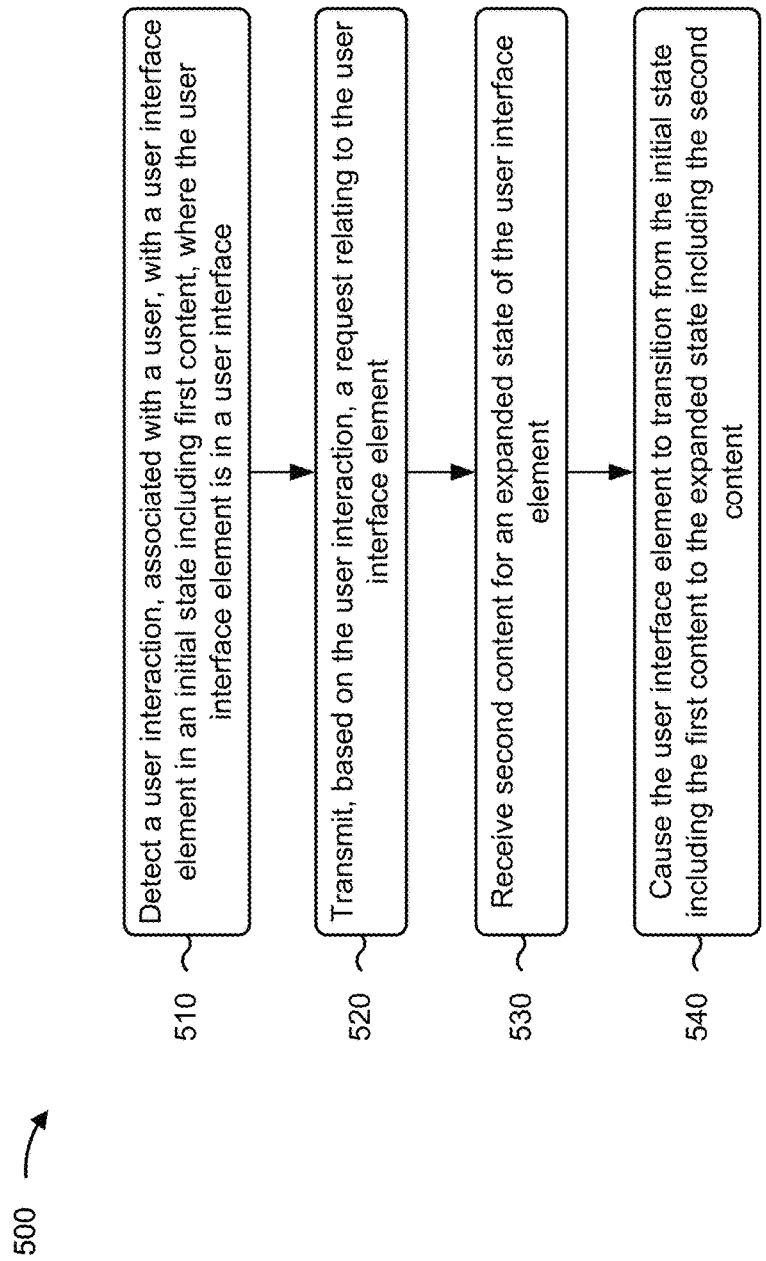
FIG. 5 is a flowchart of an example process associated with generating dynamic user interface content, in accordance with some embodiments of the present disclosure.

FIG. 5 is a flowchart of an example process 500 associated with generating dynamic user interface content. In some implementations, one or more process blocks of FIG. 5 may be performed by the user device 210. In some implementations, one or more process blocks of FIG. 5 may be performed by another device or a group of devices separate from or including the user device 210, such as the content system 220. Additionally, or alternatively, one or more process blocks of FIG. 5 may be performed by one or more components of the device 300, such as processor 320, memory 330, input component 340, output component 350, and/or communication component 360.

As shown in FIG. 5, process 500 may include detecting a user interaction, associated with a user, with a user interface element in an initial state including first content, where the user interface element is in a user interface (block 510). For example, the user device 210 (e.g., using processor 320, memory 330, and/or input component 340) may detect a user interaction, associated with a user, with a user interface element in an initial state including first content, as described above in connection with reference number 110 of FIG. 1B. As an example, The user interaction may include a hovering event associated with the user interface element (e.g., hovering a cursor over the user interface element), a clicking event associated with the user interface element (e.g., the user has clicked on the user interface element via the user interface), or a tapping event associated with the user interface element (e.g., the user has tapped a touchscreen on the user interface element), among other examples.

As further shown in FIG. 5, process 500 may include transmitting, based on the user interaction, a request relating to the user interface element (block 520). For example, the user device 210 (e.g., using processor 320, memory 330, and/or communication component 360) may transmit, based on the user interaction, a request relating to the user interface element, as described above in connection with reference number 115 of FIG. 1B. As an example, the request may indicate data relating to the user's use of the user interface.

As further shown in FIG. 5, process 500 may include receiving second content for an expanded state of the user interface element (block 530). For example, the user device 210 (e.g., using processor 320, memory 330, and/or communication component 360) may receive second content for an expanded state of the user interface element, as described above in connection with reference number 150 of FIG. 1E. As an example, the second content may include data indicating one or more destinations (e.g., web pages, URLs, or the like) and associated textual content for one or more links. In some implementations, the second content is based on one or more user interface attributes associated with a use of the user interface by the user.

As further shown in FIG. 5, process 500 may include causing the user interface element to transition from the initial state including the first content to the expanded state including the second content (block 540). For example, the user device 210 (e.g., using processor 320 and/or memory 330) may cause the user interface element to transition from the initial state including the first content to the expanded state including the second content, as described above in connection with reference number 155 of FIG. 1E. As an example, the transition from the initial state to the expanded state resizes the user interface element to a larger size.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating dynamic user interface content, the system comprising:
    one or more memories; and
    one or more processors, communicatively coupled to the one or more memories, configured to:
        receive, from a user device presenting a web page of a website, a request relating to a user interface element of the web page,
            wherein the request is based on a user interaction, associated with a user, with the user interface element in an initial state including first content, and
            wherein the user interaction is a hovering event, a clicking event, or a tapping event;
        identify, responsive to the request, second content for an expanded state of the user interface element based on one or more user interface attributes associated with a use of the website by the user,
            wherein the second content includes one or more links for the website; and
        transmit, to the user device, the second content to cause the user interface element to transition from the initial state including the first content to the expanded state including the second content.

2. The system of claim 1, wherein the one or more user interface attributes relate to one or more of:
    an amount of time that the user has spent on the website,
    an amount of time that the user has spent on one or more web pages of the website,
    a browsing history associated with the user for the website,
    scrolling activity associated with the user for the website, or
    clicking activity associated with the user for the website.

3. The system of claim 1, wherein the one or more processors, to identify the second content, are configured to:
    determine one or more categorizations for the user based on the one or more user interface attributes; and
    generate, using a generative language model, textual content for the second content based on the one or more categorizations.

4. The system of claim 1, wherein the one or more user interface attributes include one or more current user interface attributes relating to a current visit of the user to the website, and one or more historical user interface attributes relating to one or more previous visits of the user to the website.

5. The system of claim 4, wherein the one or more processors are further configured to:
    retrieve, responsive to the request, information indicating the one or more historical user interface attributes from at least one of:
        one or more data structures, or
        one or more cookies.

6. The system of claim 1, wherein the one or more processors are further configured to:
    cause storing of information indicating the second content for use in connection with a subsequent request.

7. The system of claim 1, wherein the one or more processors, to identify the second content, are configured to identify the second content using an algorithm, and
    wherein the one or more processors are further configured to:
        determine, using a machine learning model, an adjustment to the algorithm based on the second content and user activity associated with the user after the user interface element transitions from the initial state including the first content to the expanded state including the second content; and
        adjust the algorithm in accordance with the adjustment.

8. The system of claim 1, wherein the second content identifies at least two links for the website.

9. The system of claim 1, wherein the first content is a symbol.

10. A method of generating dynamic user interface content, comprising:
    receiving, from a user device, a request relating to a user interface element of a user interface presented on the user device,
        wherein the request is based on a user interaction, associated with a user, with the user interface element in an initial state including first content, and
        wherein the user interaction is a hovering event, a clicking event, or a tapping event;
    identifying, responsive to the request, second content for an expanded state of the user interface element based on one or more user interface attributes associated with the user; and
    transmitting, to the user device, the second content to cause the user interface element to transition from the initial state including the first content to the expanded state including the second content.

11. The method of claim 10, wherein the request indicates the one or more user interface attributes.

12. The method of claim 11, further comprising:
    causing storing of information indicating the one or more user interface attributes, for use in connection with a subsequent request, in at least one of:
        one or more data structures, or
        one or more cookies.

13. The method of claim 10, wherein identifying the second content comprises:
    identifying the second content based on the one or more user interface attributes and based on one or more of a location of the user interface element in the user interface or a type of the user device.

14. The method of claim 10, wherein the user interaction with the user interface element is subsequent to a previous interaction, of the user, with the user interface element in the initial state including the first content, and
    wherein the second content is different from previous second content for the user interface element in the expanded state associated with the previous interaction.

15. The method of claim 10, wherein identifying the second content comprises:

extracting a set of factors from the one or more user interface attributes;

applying respective sets of weights, associated with a plurality of content options, to the set of factors to determine a plurality of scores for the plurality of content options; and identifying the second content based on the plurality of scores for the plurality of content options.

16. The method of claim 10, wherein the first content is graphical content and the second content includes textual content.

17. A non-transitory computer-readable medium storing a set of instructions, the set of instructions comprising:

one or more instructions that, when executed by one or more processors of a device, cause the device to:

detect a user interaction, associated with a user, with a user interface element in an initial state including first content, wherein the user interaction is a hovering event associated with the user interface element, a clicking event associated with the user interface element, or a tapping event associated with the user interface element, and wherein the user interface element is in a user interface presented on the device;

transmit, to a server device and based on the user interaction, a request relating to the user interface element;

receive, from the server device, second content for an expanded state of the user interface element, wherein the second content is identified in response to the request, wherein the second content is based on one or more user interface attributes associated with a use of the user interface by the user, and wherein the second content includes one or more links to one or more resources; and cause the user interface element to transition from the initial state including the first content to the expanded state including the second content.

18. The non-transitory computer-readable medium of claim 17, wherein the user interface is a web page of a website, and wherein the one or more resources are one or more other web pages of the website.

19. The non-transitory computer-readable medium of claim 17, wherein the user interface element is a button, and wherein the second content includes one or more sub-buttons of the button.

20. The non-transitory computer-readable medium of claim 17, wherein the one or more instructions, when executed by the one or more processors, further cause the device to:

monitor the use of the user interface by the user to identify the one or more user interface attributes, wherein the request indicates the one or more user interface attributes.

* * * * *